United States Patent [19]

Hawthorne

[11] 4,026,418
[45] May 31, 1977

[54] HYDRAULIC CUSHIONING UNIT WITH A GAS RETURN

[75] Inventor: Vaughn T. Hawthorne, East Amherst, N.Y.

[73] Assignee: Keystone Industries, Inc., Chicago, Ill.

[22] Filed: Apr. 8, 1975

[21] Appl. No.: 566,065

[52] U.S. Cl. .................................... 213/8; 213/43
[51] Int. Cl.² ......................................... B61G 9/16
[58] Field of Search ............ 213/43, 223, 8; 267/3, 267/64 R; 293/DIG. 2, 85; 188/313, 314, 315, 274, 287, 269

[56] References Cited

UNITED STATES PATENTS

| | | | |
|---|---|---|---|
| 3,217,897 | 11/1965 | Peterson | 213/43 |
| 3,410,416 | 11/1968 | Peterson | 213/43 |
| 3,596,774 | 8/1971 | MacCurdy | 213/43 X |
| 3,656,632 | 4/1972 | Karakashian et al. | 213/43 |
| 3,851,768 | 12/1974 | Hawthorne | 213/43 |

Primary Examiner—Robert B. Reeves
Assistant Examiner—John P. Shannon
Attorney, Agent, or Firm—Hibben, Noyes & Bicknell, Ltd.

[57] ABSTRACT

This disclosure deals with a hydraulic cushioning unit for a railway car, including a gas return. The unit includes a main reservoir which is precharged with a hydraulic oil and an inert gas. At least one reservoir extension is also provided at the upper side of the unit, the extension enabling the unit to be charged with relatively large amounts of oil and gas. The oil volume when the unit is in its neutral position is approximately 76 percent of the total reservoir volume, and the reduction in the gas volume during impact conditions is not more than approximately 40 percent. The unit includes a tube and two separate charging passages for precharging the unit to the desired oil and gas volumes.

15 Claims, 10 Drawing Figures

HYDRAULIC CUSHIONING UNIT WITH A GAS RETURN

Hydraulic impact cushioning units have been in use in the railway industry for many years, and such a unit normally includes a device for returning the unit to its neutral position after an impact. Spring returns have commonly been used for this purpose, but recently gas return units have been developed and put into use. In a gas return unit, a volume of gas under pressure forces the unit toward its neutral position, and the gas is increasingly compressed during impact conditions. A gas return has a number of advantages over a spring return, including the facts that a gas return is more economical to manufacture, it exerts a greater return force, it is easier to adjust, and it does not include mechanical parts which are subject to failure.

In some gas return units, the gas is maintained separated from the hydraulic oil, but such an arrangement of course requires the parts necessary to separate the gas and oil. However, the MacCurdy U.S. Pat. No. 3,596,774, issued Aug. 3, 1971, discloses a gas return hydraulic cushioning unit wherein the oil and the gas are in direct contact.

When designing a gas return hydraulic cushioning unit, the designer starts out with the facts that the unit must be sized to fit within the enclosure formed by the inverted U-shaped sill, and that there are manufacturing advantages in making the unit with a round cross-sectional shape. It is also desirable for the piston and the inner or high pressure cylinder through which the piston moves to be below the oil level so that, when the piston moves during impact, it will displace oil and not gas.

With reference to the MacCurdy patent, the above requirements resulted in a unit wherein the piston and the high pressure cylinder have a relatively small diameter, the piston having substantially the same diameter as the piston rod. Since the piston is relatively small, the amount of oil forced by it out of the cylinder during an impact is also relatively small. This is considered by experts in this art to be a disadvantage because the cushioning performance is enhanced when a large amount of oil is forced out of the high pressure cylinder during impact conditions.

Further, the neutral or precharge gas pressure in the MacCurdy unit is 1000 psi, and this relatively high pressure is disadvantageous for two reasons. First, the cushioning performance is better when there is a large pressure drop or differential across the holes formed in the high pressure cylinder. Therefore if the gas pressure is very high, the differential will be low and the performance will be reduced. Further, there is a danger that the unit will burst because of the high pressure. In the MacCurdy unit, the volume occupied by the gas when the piston and the rod are in the fully loaded position is approximately only 32 percent of the initial gas volume when the unit is in the neutral position. This relatively large reduction in the volume of the gas and the high initial gas pressure result in very high pressures which are difficult to contain during impact.

It is a general object of the present invention to provide a hydraulic cushioning unit including a gas return, which avoids the foregoing disadvantages.

A cushioning unit in accordance with the present invention comprises an inner high pressure cylinder member, an outer member positioned around said inner member, heads at the ends of said inner and outer members, a piston movable within said inner member, a piston rod connected to said piston and slidable within an opening formed through one of said heads, a plurality of holes formed through said inner member for the flow of oil between the reservoirs formed by said inner and outer members, and means at the upper side of said unit and forming a reservoir extension, at least one passage being provided in said unit and connecting said reservoir extension with the reservoir formed by said inner and outer members.

When the unit is charged with oil and gas, the volume occupied by the oil when the unit is in its neutral position is not more than approximately 76 percent of the total reservoir volume including the extension. Further, the reduction in the volume of the gas is such that the gas volume when the unit is in the loaded position is at least approximately 40 percent of the gas volume when the unit is in the neutral position.

The relatively large proportion of the reservoir for oil results in further advantages attained due to the fact that a relatively large amount of the gas is able to dissolve in the oil and to produce a foaming action.

An improved arrangement is also provided for charging the unit with the desired amounts of oil and gas.

The foregoing and other objects and advantages of the present invention will be better understood from the following detailed description taken in conjunction with the accompanying figures of the drawings, wherein:

With reference to FIGS. 1 to 5, part of a railway car is shown including a center sill 11 and part of an undercarriage or frame 12. The center sill 11 is in the shape of an inverted U-shaped channel member including two vertically extending sides 13 and 14, a web 16 connecting the upper edges of the two vertical sides 13 and 14, and two laterally outwardly extending flanges 17 which are formed at the lower edges of the two sides 13 and 14. The sill 11 extends longitudinally of the railway car and at each end is connected to a coupler (not shown) of the car.

Figures 1, 4, 5:
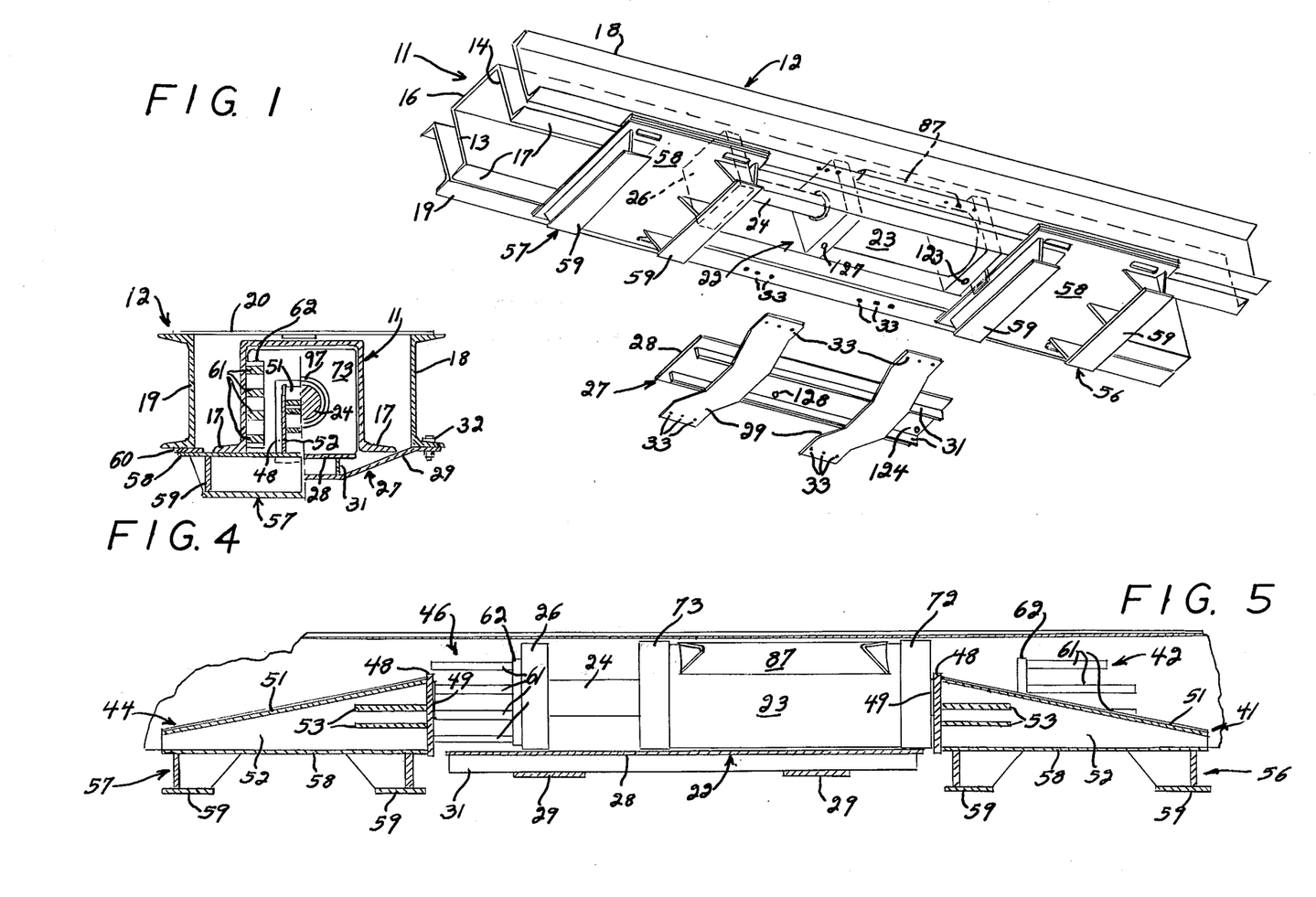
FIG. 1 is a perspective view of a portion of a railway car including a cushioning unit embodying the invention.
FIG. 4 is a sectional view taken on the line 4—4 of FIG. 3.
FIG. 5 is a view similar to FIG. 2 but showing different positions of some of the parts.

The undercarriage supports the body of the railway car, and includes two longitudinally extending U-shaped channels 18 and 19. Each channel has its center web positioned vertically and parallel to the sides 13 and 14 of the center sill 11. The two flanges of each channel 18 and 19 extend laterally away from the center sill 11. As best shown in FIG. 4, the lower flanges of the channels 18 and 19 are nearly in the same plane as the flanges 17 of the center sill 11, and a plurality of longitudinally spaced plates 20 extend across the top of the sill 11 and are secured to the channels 18 and 19.

Figure 2:
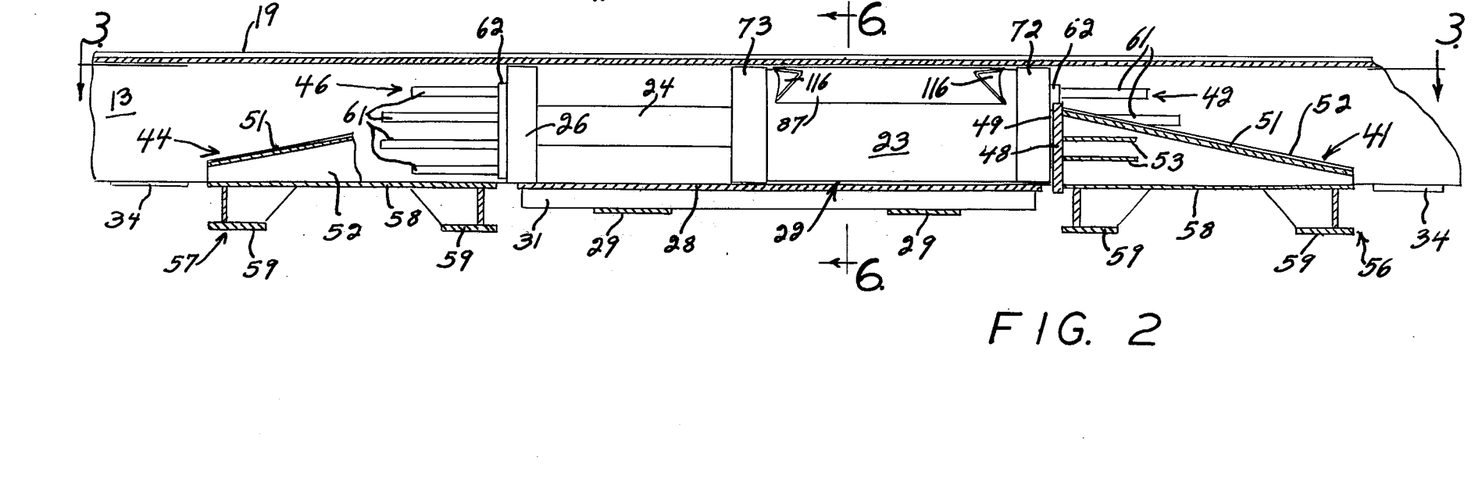
FIG. 2 is a fragmentary view partially in section of the structure shown in FIG. 1.
Figure 3:
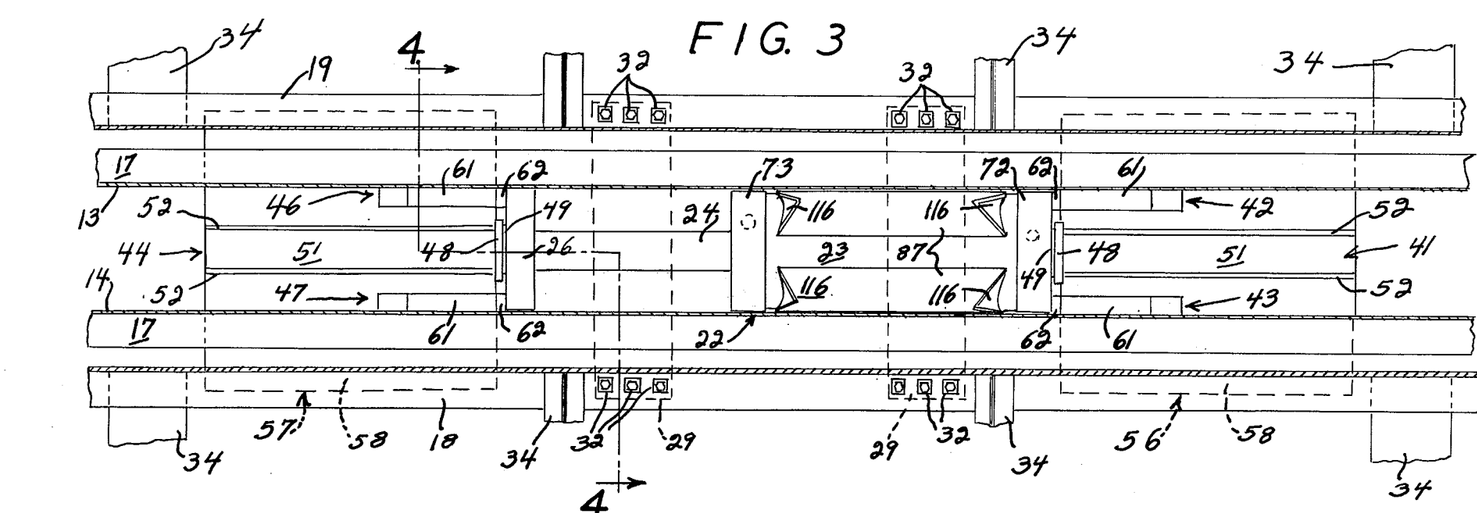
FIG. 3 is a sectional view taken on the line 3—3 of FIG. 2.

The sill 11 is movable relative to the undercarriage 12, and a hydraulic cushioning unit 22 is connected between the center sill 11 and the two channels 18 and 19 in order to absorb impact energy during operation of the railway car. The cushioning unit 22 includes an outer cylinder 23 (FIGS. 1 to 3), a piston rod 24, and a rod end 26 which is attached to the outer or front end of the piston rod 24. The unit 22 is supported within the space formed by the walls 13 and 14 and web 16 of the center sill 11, by a support 27 (FIGS. 1 and 2) which includes a support plate 28 and two brackets 29. The plate 28 is elongated in the longitudinal direction of the car and has two strengthening bars or braces 31 secured as by welding to the underside thereof. The support plate 28 is positioned underneath the cylinder 23 and the rod end 26 and the unit 22 slides on the upper surface of the plate 28 during operation. The two brackets 29 extend laterally of the sill 11 and the undercarriage 12 and are secured to the bottom flanges of the two channels 18 and 19. With reference to FIGS. 3 and 4, a plurality of bolts 32 are positioned through holes 33 (FIG. 1) formed adjacent the ends of the brackets 29 and in the bottom flanges of the channels 18 and 19, and the bolts rigidly secure the brackets 29 to the undercarriage 12. The center areas of the brackets 29 are bent downwardly to extend under the bars 31 as best shown in FIGS. 1 and 4 in order to support the bars. The brackets 29, the bars 31 and the plate 28 are secured together as by welding. With reference to FIGS. 2 and 3, a plurality of laterally extending cross braces 34 are also secured to the channels 18 and 19 and form part of the undercarriage of the car.

The cushioning unit 22 is positioned between longitudinally spaced stops secured to the sill 11 and stops secured to the undercarriage 12. With specific reference to FIGS. 2, 3 and 5, at the rear end, which is the rightward end, of the cushioning unit 22 are mounted a rear end undercarriage stop 41 and a pair of rear end sill stops 42 and 43, and adjacent the front end of the unit 22 are mounted a front end undercarriage stop 44 and two front end sill stops 46 and 47. Each of the undercarriage stops 41 and 44 comprises a vertically extending bar 48, a small wear plate 49 being preferably provided between each bar 48 and the unit 22. In each stop 41 and 44, a plate 51 slants longitudinally downwardly and away from the unit 22. The uppermost end of each plate 51 is secured to the associated bar 48, and the longitudinally extending side edges of the plates 51 are secured to two vertically extending side support plates 52. Further, a pair of horizontally extending braces 53 are secured between the two vertical plates 52 and are secured to the vertical bars 48 for additional support.

The two undercarriage stops 41 and 44 are respectively supported by a rear end undercarriage stop support 56 and by a front end undercarriage stop support 57. Each of the stop supports 56 and 57 includes a horizontally extending support plate 58 which extends across the underside of the sill 11 and is secured to the bottom flanges of the two channels 18 and 19 as shown in FIGS. 1 and 4. The two side support plates 52 of each stop are secured to the upper surface of the associated plate 58, and the bar 48 is secured to the edge of the plate 58 which is adjacent the cushioning unit 22.

Additional supports 59 are welded to the undersides of the two plates 58 as shown in FIGS. 1 and 2. A spacer or shim 60 (FIG. 4) is also secured between the plate 58 and the lower flanges of the channels 18 and 19.

Each of the sill stops 42, 43, 46 and 47 comprises four vertically spaced bars 61 and a vertically extending bar 62. The two bars 62 of the stops 42 and 43 are secured as by welding to the sill walls 13 and 14 at the rear end of the unit 22 and the two bars 62 of the front end sill stops 46 and 47 are similarly secured at the front side of the rod end 26. The four parallel bars 61 of each of the sill stops are also secured as by welding to the sides 13 and 14 of the center sill and they are welded to the vertical bars 62. The center two of the four parallel bars 61 of each stop may be made longer than the other two to withstand stress in this area.

With reference to FIGS. 2 and 5, assume that the parts are in their no-load or neutral positions shown in FIG. 2. It will be apparent that if an impact force on the left end of the sill 11 moves the sill toward the right as seen in these two figures relative to the two channels 18 and 19 of the undercarriage, the four sill stops 42, 43, 46 and 47 will also move toward the right with the sill as seen in FIG. 5. Such movement of the two front end sill stops 46 and 47 will force the rod end 26 and the rod 24 toward the right. The cylinder 23 will however be prevented from moving toward the right because the undercarriage stop 41 at the rear end of the unit 22 will remain stationery. Consequently, the rod 24 will be forced into the cylinder 23. As it will be described hereinafter, the cylinder 23 is part of a hydraulic cushioning arrangement which absorbs the energy of the impact force and thus cushions the impact.

Similarly, if the sill 11 were to be forced from the no-load position toward the left as seen in FIGS. 2 and 5, the rod end 26 and the rod 24 will be prevented from moving toward the left by the front end undercarriage stop 44. However, the two rear end sill stops 42 and 43 will move toward the left along with the sill 11 and force the cylinder 23 toward the left. Consequently, the rod 24 will once again be forced into the cylinder 23 and the hydraulic cushioning arrangement will absorb the impact energy.

It will be apparent therefore that, regardless of the direction of movement of the sill 11 relative to the undercarriage 12, the rod end 26 and the cylinder 23 will be pressed together, thereby permitting use of a single-acting hydraulic cushioning arrangement.

Figure 6:
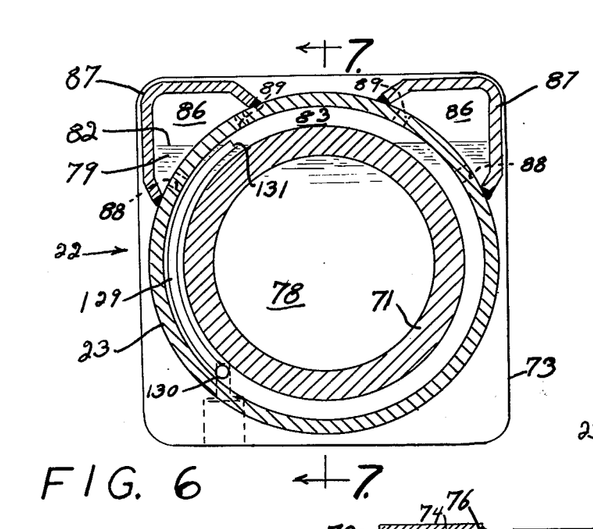
FIG. 6 is an enlarged sectional view taken on the line 6—6 of FIG. 2.
Figure 7:
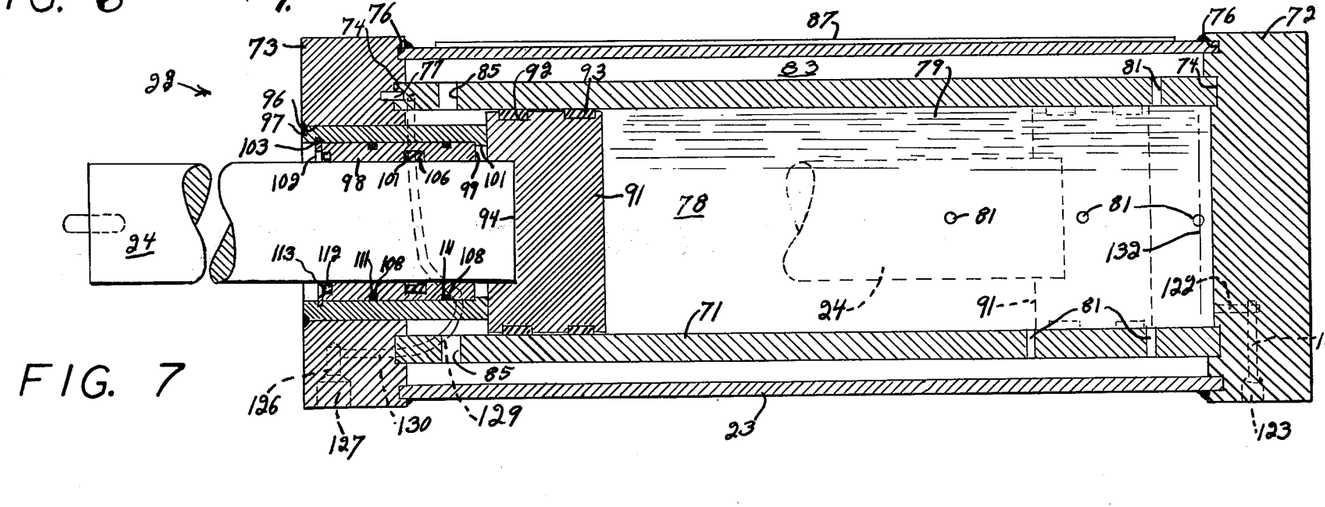
FIG. 7 is a sectional view taken on the line 7—7 of FIG. 6.
Figure 8:
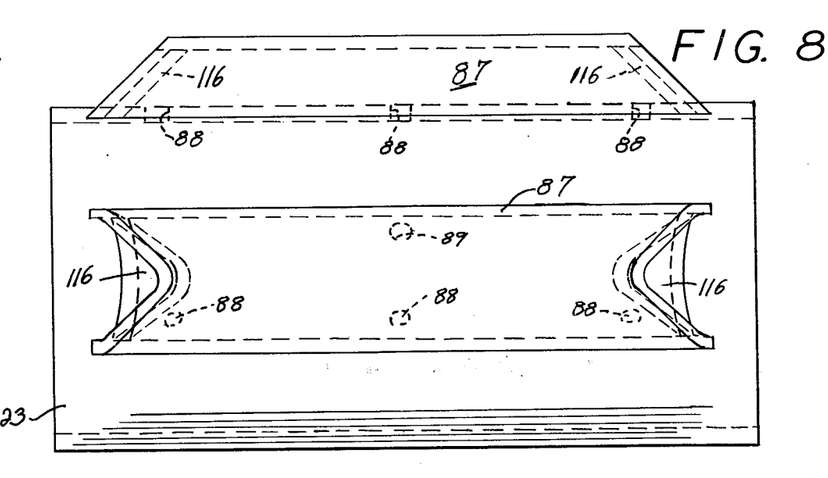
FIG. 8 is a view of a part of the cushioning unit.

The construction of the hydraulic cushioning unit 22 is best illustrated in FIGS. 6 to 8, and comprises the outer cylinder 23, an inner cylinder 71 which is located concentrically within the outer cylinder 23, a rear cylinder head 72 and a front cylinder head 73. As shown in FIGS. 1 and 6, the two cylinder heads 72 and 73 are generally square when viewed from the ends of the cushioning unit, and the corners of the heads are rounded off. The inner and outer cylinders 71 and 23 fit into annular recesses 74 and 76 formed in the adjacent faces of the two cylinder heads 72 and 73. As best shown in FIG. 6, the outer diameter of the outer cylinder 23 is slightly less than the width of the two cylinder heads 72 and 73. The two cylinder heads 72 and 73 are held in assembled relation with the cylinders 23 and 71 by welding the ends of the outer cylinder 23 to the two cylinder heads 72 and 73. While the inner cylinder 71 is not welded to the two cylinder heads, a dowel 77 is positioned in holes formed in the adjoining end surfaces of the inner cylinder 71 and the front cylinder head 73 and serves to provide proper angular orientation of these members.

The space within the interior of the inner cylinder 71 forms a reservoir 78 for a hydraulic oil 79. A plurality of circumferentially and longitudinally spaced holes 81 are formed through the wall of the inner cylinder 71 adjacent its rear end, and consequently the oil 79 is able to flow back and forth between the reservoir 78 and the space between the two cylinders 71 and 23. It is important that some of the holes 81 are located at the uppermost side of the cylinder 71 to prevent entrapment of air and gas in the cylinder 71. As will be described hereinafter, the oil 79 fills the unit up to the level indicated by the reference numeral 82 in FIG. 6 when the unit is at rest under no-load conditions. In addition to the holes 81, a plurality of larger holes 85 are formed in the cylinder 71 adjacent its front end. In addition to the oil 79, an inert gas, preferably nitrogen, under pressure is also provided in the hydraulic unit and fills the space above the oil 79. With reference to FIG. 6, the gas, under quiescent or no-load conditions, fills the space above the interface 82 within the upper end of the outer cylinder 23, this upper space being indicated by the reference numeral 83. To increase the amount of space available for the gas, a reservoir extension is provided at the upper side of the unit 22. In the form of the unit shown in FIGS. 1 to 8, the extension is formed by two ears 87, the spaces within the ears being indicated by the numeral 86 (FIG. 6). A plurality of holes 88 (FIGS. 6 and 8) are formed through the outer cylinder 23 and connect the spaces 86 within the ears 87 and the spaces 83 within the outer cylinder 23. The holes 88 are preferably located adjacent the lower edges of the ears 87 so that the oil 79 and the gas can move into and out of the ears 87 without the oil becoming trapped in the ears. Additional holes 89 may also be formed in the cylinder 23 adjacent the upper edges of the ears 87 for the flow of air and gas.

With reference once again to FIG. 7, the cushioning unit 22 further includes a piston 91 which is movable through the reservoir 78 formed by the inner cylinder 71. The piston 91 consists of a circular, relatively thick block of metal and has two annular grooves 92 formed in its outer surface for piston rings 93, the rings 93 being axially spaced and both acting as seals and preventing tilting movement of the piston 91. On the front side of the piston 91 is formed a centrally located circular opening 94 which receives the rearward end of the piston rod 24. The piston rod 24 is secured in the opening 24 as by welding in order to hold the piston 91 and the piston rod 24 together.

The front cylinder head 73 has a round relatively large centrally located opening 96 (FIG. 7) formed therein which receives an annular sleeve 97 and a bushing 98. The sleeve 97 fits tightly within the opening 96 and is preferably welded to the front cylinder head 73. The bushing 98 is positioned within the sleeve 97, and the rearward end 99 of the bushing 98 abuts an inwardly extending flange 101 of the sleeve 97. The other end of the bushing 98 engages a retaining ring 102 which is positioned in an annular groove 103 formed in the inner surface of the sleeve and abuts the front end of the bushing 98. Thus, the bushing 98 is prevented from moving toward the left relative to the sleeve 97 by the ring 102 and it is prevented from moving toward the right by the flange 101.

The inner and outer surfaces of the bushing 98 are sealed by an oil 106 positioned in a groove 107 formed in the bushing 98 on its inner surface, and by two O-rings 108 which are positioned in grooves formed in the outer surface of the bushing 98. Back up rings 111 may be positioned in the O-ring grooves on the front sides of the O-rings 108. Further, another groove 112 is formed on the inner surface of the bushing 98 and receives a wiper ring 113 which is provided to wipe dirt from the piston rod 24 during movement of the rod 24 into the cylinder 71.

The foregoing described arrangement provides a good oil seal at both the inner and outer surfaces of the bushing 98. There is a tight fit between the bushing 98 and the sleeve 97 and the pressure on the front side of the piston 91, between the piston 91 and the bushing 98, is relatively low, and consequently there is no leakage of oil out of the reservoir 78. Further, the fact that the pressure between the piston 91 and the bushing 98 is relatively low and the fact that the area of the rear surface of the bushing 98 is relatively small, enables the retaining ring 102 to hold the bushing 98 in place.

With reference once again to the ears 87, they are provided at the upper side of the cylinder 23 so that the gas and oil can flow into the interior space formed by the two ears 87. Each ear 87 is an elongated angular piece of metal which has its two edges secured as by welding to the outer surface of the outer cylinder 23. As shown in FIG. 8, the ends of each ear are cut to approximately a 45° angle and are closed by two triangularly shaped end members 116 which are positioned within the interior of the ears 87 and are welded to the inner surface of the ears 87 and to the cylinder 23. The edge of each of the end members 116, which is adjacent the outer surface of the outer cylinder 23 is curved to conform to the curvature of the outer cylinder 23. The ears 87 extend nearly the full length of the cylinder 23 and are sized to provide the required volume of gas.

Another important feature of the present invention is the fact that the cushioning unit 22 may be filled or charged both with the oil 79 and with the gas after the unit has been installed in a railway car, and that the unit will be charged with the correct or desired amount of oil. Since the unit is enclosed on three sides by the sill 11, such charging with oil and gas must be accomplished from the bottom of the unit. With reference to FIG. 7, the filling arrangement includes a vertical passage 121 formed in the bottom side of the rear cylinder head 72. The passage 121 extends upwardly from the bottom side and communicates by way of a horizontal passage 122 with the reservoir 78. A removable plug 123, closes the lower end of the passage 121. The plug 123 may also be seen in FIG. 1 and it should be noted that a hole 124 in the plate 28 is provided to make the plug 123 and the passage 121 accessible from the underside of the car.

The front cylinder head 73 has a vertical passage 126 (FIGS. 6 and 7) formed therein from its underside up to approximately the level of the space between the inner cylinder 71 and the outer cylinder 23. A removable plug 127 is also fitted in the lower end of the passage 126 in order to seal the passage. With reference once again to FIG. 1, it should be noted that a hole 138 is formed in the plate 28 below the plug 127 to make the plug 127 accessible from the under side of the railway car. A generally horizontal passage 130 connects the passage 126 with the space between the inner and outer cylinders 71 and 23. Within the annular space between the inner cylinder 71 and the outer cylinder 23 is fastened a curved tube 129 (FIGS. 6 and 7). The lower end of the tube 129 is secured in the end of the passage 130, and from the passage 130, the tube 129 curves upwardly as shown in FIGS. 6 and 7. The upper end of the tube 129 is open and it terminates at the point indicated by the numeral 131 which is the desired level 82 of the oil. The lower end of the tube is welded to the head 73 around the margin of the passage 130 and it is tack welded to the head 73 adjacent the upper end 131.

Considering first the method of filling the unit with oil and gas after the unit has been installed in a car, first the plugs 123 and 127 are removed from the passages 121 and 126. A supply of hydraulic oil is connected to the passage 121 and the oil is pumped upwardly through the passages 121 and 122 and into the reservoir 78 and into the space between the two cylinders 23 and 71. As the level of the oil rises, it completely fills the main reservoir and some of the oil passes through the holes 88 and into the lower parts of the two ears 87. The displaced air flows out of the unit through the holes 89, the space 83, and the tube 129. When the level of the oil reaches the upper end 131 of the tube 129, which as previously mentioned is the desired level of the oil, some of the oil spills into the upper end of the tube 129 and drains out of the passage 126. At this point, the operator stops the flow of oil into the passage 121 and secures the plug 123 tightly in place. Thereafter, a source of inert gas, such as nitrogen as previously mentioned, is attached to the passage 126 and the gas under pressure, is forced through the passage 126, through the tube 129 and into the spaces 83 and 86 above the level of the oil. The gas pressure is preferably 600 lbs. per square inch. After the unit has been charged with gas, the operator quickly removes the source of gas and inserts the plug 127. At the start of the gas charging operation, the spaces 83 and 86 are filled with air and the nitrogen mixes with the air. However, this does not create a problem because nitrogen is the primary constituent of air and the volume of the air is much smaller than the volume of the nitrogen when the difference in the pressure is taken into account.

The filling operation may be simplified by providing special plugs 123 and 127 having shut-off valves. Then, the unit 22 could be charged with the oil and then the gas through the open valves, and the valves could be closed after charging but before disconnecting the oil and the gas supplies.

With the initial precharge gas pressure of approximately 600 psi, the oil in the reservoir 78 is also of course at this same pressure is exerted against the rearward side of the piston 91. Since the area connected to the rod 24 on the left hand or front side of the piston 91 is at atmospheric pressure, the resultant force on the piston 91 is such as to push the rod 24 and the piston 91 toward the left as seen in FIG. 7. In an average size cushioning unit, a force of approximately 7,500 lbs. is exerted on the piston 91 in a direction to push it toward the left. This force holds the piston 91 against the sleeve 97.

Under normal unloaded conditions, such as when the car is standing in a switching yard, the oil will be in a quiescent state and there will be an interface between the oil and the gas. However, due to the initial gas pressure and the nature of the gas and the oil, some of the gas will dissolve in the oil. Since this action will result in a drop in pressure it may be desirable to charge the unit to a higher pressure than 600 psi, such as approximately 650 psi at 70° F ambient temperature, so that it will stabilize at approximately 600 psi after the initial dissolving action has taken place. During movement of the car as in normal hauling conditions, the vibration will result in foaming or mixing of the oil and gas.

Assuming no-load operating conditions of the unit, the piston 91 will be in the neutral position illustrated in solid lines in FIG. 7 and the rear cylinder head 72 and the rod end 26 will be closely adjacent or held against the stops at the opposite ends of the cushioning unit. If the sill 11 receives an impact from the left hand end, as seen in FIGS. 2 and 7, the rod 24 and the piston 91 will be forced toward the right as seen in these figures, and it will move to, for example, the position shown in dashed lines in FIG. 7. As the piston 91 moves toward the right, oil in the reservoir 78 will be forced out of the high pressure cylinder 71 through the holes 81. The extreme turbulence produced as the oil flows through the holes 81, which generates heat, and the increase in the pressure increases the foaming action previously mentioned and it also increases the amount of the gas dissolved in the liquid. As the piston 91 moves toward the right, the oil flows through the annular space between the two cylinders 23 and 71 and flows through the relatively large holes 85 into the space between the piston 91 and the front cylinder head 73. Since the rod 24 takes up an increasing amount of the reservoir space as it moves toward the right, the pressure in the unit will increase as the piston 91 approaches the head 72. The gas in the ears 87 and in the space 83 is compressed as the oil level rises. The piston 91 moves through the reservoir 78 and increasingly compresses the oil and the gas mixture and closes off an increasing number of the holes 81 as it moves toward the right. The maximum extent of movement of the piston 91 toward the right is up to approximately the dash-dot line shown in FIG. 7, and at this point the rod end 26 meets the front side of the front cylinder head 73. The pressure in the unit rises from 600 psi up to approximately 2,000 psi. Any continued force on the cushioning unit results in direct transmission, through metal-to-metal contact, of the force through the rod end 26, the front cylinder head 73, the two cylinders 71 and 23, the rear cylinder head 72 and the stops secured to the sill and to the undercar at the opposite ends of the unit 22.

As soon as the impact force is removed, the compressed oil-gas mixture exerts a force on the right hand or rearward side of the piston 91 and the rod 24 toward the left as seen in FIG. 7. This movement results in a reverse flow of the oil and gas from the space on the front side of the piston, through the holes 85, through the annular space between the cylinders 23 and 71 and into the reservoir 78 through the holes 81. Movement of the piston in this direction of course ceases when the rod 24 reaches the position shown in FIG. 2. With the drop in the pressure, some of the gas which was dissolved in the liquid under the high pressure conditions is released by the oil and returns to gas form. However, as previously mentioned, part of the gas remains in a dissolved state in the oil and the foaming action previously described is also maintained.

As previously mentioned, in the pressure range described, in the temperature range encountered in the continental United States, and with the described choice of hydraulic oil and gas, part of the gas dissolves in the oil and a foaming action is produced. The present invention makes use of this phenomenon to achieve a number of distinct advantages. First of all, if the temmperature of the oil and the gas increases above average ambient temperatures during operation, such an increase being due for example to movement of the railway car through a high temperature area such as a hot desert, an added amount of the gas will dissolve in the oil and thereby prevent excessive pressure. Another way in which the temperature may rise is of course during impact conditions when heat is generated due to the turbulent flow of oil through the holes 81 and 88. Once again, an added portion of the gas will dissolve in the liquid and the turbulance will produce the aforementioned foaming action and thereby maintain the pressures within containable limits. Further, during impact conditions, the high pressure quickly increases the amount of the gas dissolved in the oil and removes more of the high pressure gas, once again maintaining the gas pressure at a containable level. Because of this operation, it has been discovered by the applicant that the pressures actually encountered within the cushioning unit during high impact conditions are considerably lower than would be expected if one did not take into account the dissolving and the foaming actions. Calculation of the pressures to be reached without taking into account the dissolving and the foaming actions would cause a designer to anticipate extremely high pressures which would be close to or beyond the burst limits of the cushioning unit. However, in a cushioning unit in accordance with the present design, with a choice of oil and gas and a choice of the oil and gas ratio volumes as described, the dissolving and the foaming action is produced which prevents pressures from exceeding approximately 2,000 psi. The desired oil and gas volumes and the ratios thereof are attained by providing an extension of the reservoir adjacent the top of the main reservoir, which enables the provision of a relatively large volume of the gas relative to the volume of oil, and also a relatively large volume of the oil.

In the form of the invention illustrated in FIGS. 1 through 8, the extension of the reservoir is formed by ears which are located between the front and rear heads and above the main reservoir of the unit. In the form of the invention illustrated in FIGS. 9 and 10, the extension of the reservoir is formed off to one end of the main reservoir. While the invention is illustrated in the drawings as utilizing only one or the other types of reservoir extensions, it should be understood that a cushioning unit may be provided which includes both types of extensions.

Figures 9, 10:
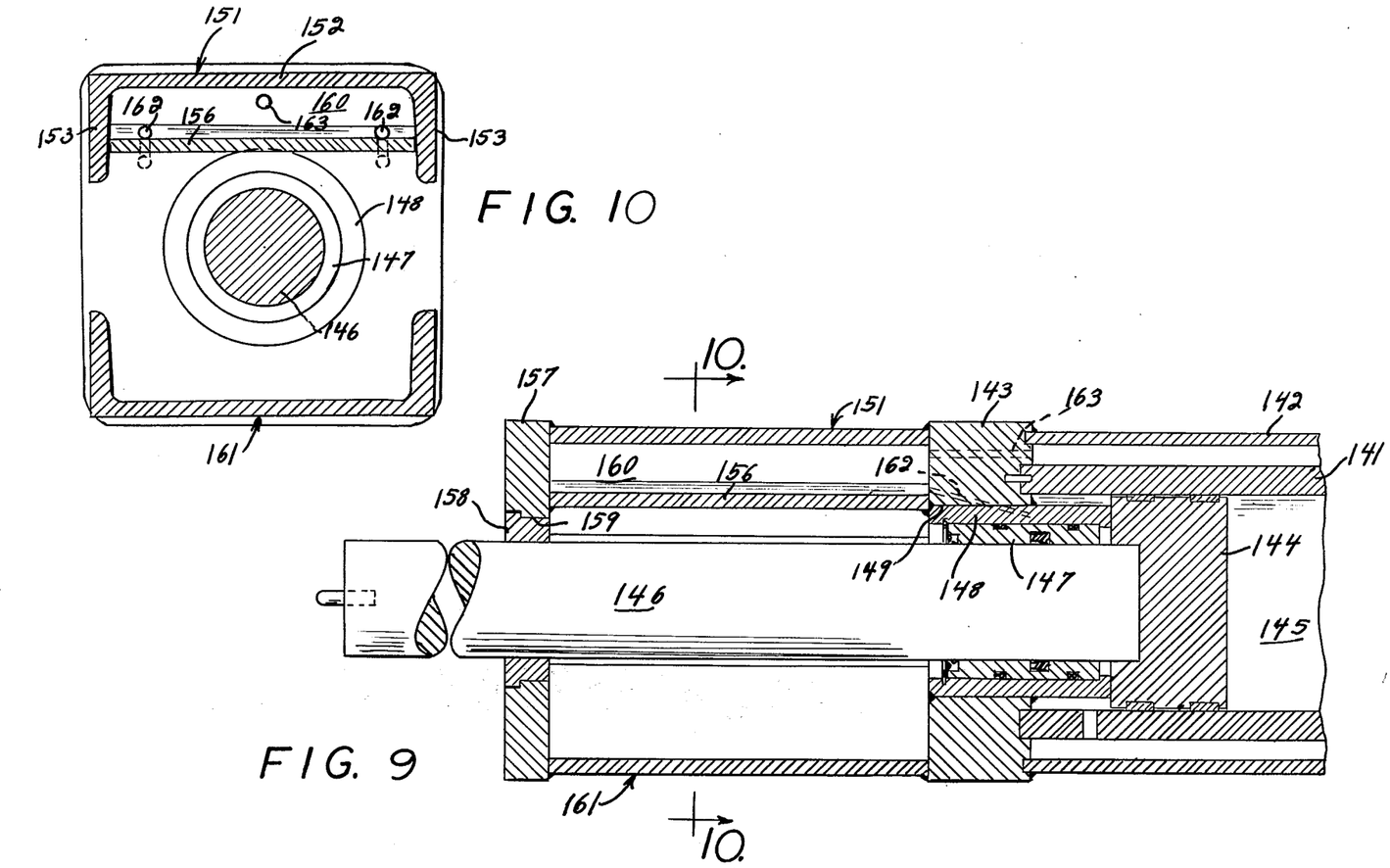
FIG. 9 is a fragmentary view partially in section of an alternate form of the invention.
FIG. 10 is a sectional view taken on the line 10—10 of FIG. 9.

The form of the invention illustrated in FIGS. 9 and 10 includes a pair of inner and outer cylinders 141 and 142 which are attached to a front head 143. A piston 144 is mounted for reciprocating movement within the main reservoir 145 formed by the inner cylinder 141, and a piston rod 146 is attached to he piston 144. A bushing 147 and a sleeve 148 are fastened in a central opening 149 formed in the front head 143 and surround the piston rod 146. A rod end (not shown) is attached to the front end of the rod 146. A filling tube (not shown) similar to the tube 129 is attached to the head 143.

The foregoing parts, and the means for filling the unit, are similar in construction to the corresponding parts of the unit illustrated in FIGS. 1 through 8 with the exception that the piston rod 146 is longer than the rod 24.

A reservoir extension 160 is formed by an inverted U-shaped channel 151 which is secured to and extends forwardly from the front side of the head 143. The web 152 (FIG. 10) extends parallel to the top side of the head 143 and the flanges 153 extend parallel to the vertical sides of the head, and the channel 151 is preferably located within the outer boundaries of the head 143, as illustrated in FIG. 10. The bottom side of reservoir extension 160 is formed by a bottom plate 156 which extends between the flanges 153 adjacent the lower ends thereof. At the front end of the channel 151 is secured a front plate 157 which is secured to the front ends of the channel 151 and the plate 156. The plate 157 is generally the same size as the head 143 although it is not as thick.

Since the piston rod 146 must be made relatively long in this form of the invention in order to provide space for the reservoir extension 160, means is provided for supporting the piston rod 146. Such means comprises a bearing 158 which is mounted in a central opening 159 formed in the front plate 157. The bottom end of the front plate 157 is supported by a lower U-shaped channel 161 which extends between and is secured to the front head 143 and to the front plate 157. The foregoing parts may be secured together as by welding.

In order to charge the extension reservoir 160 formed by the channel 152, the plate 156, the front plate 157 and the head 143, a plurality of passages 162 and 163 are formed through the head 143. The passage 163 is formed substantially horizontally through the head 143 and extends from the space between the inner and outer cylinders 141 and 142 to the reservoir extension 160. The passages 162 are provided, these passages extending from the extension 160 and slanting rearwardly and downwardly and into the main reservoir 145 formed within the interior of the inner cylinder 141. Thus, during charging of the unit shown in FIGS. 9 and 10 and during operation of the unit, oil and gas flow through the passages 162 and 163 into and out of the reservoir extension 160. The reservoir 145 and the extension 160 may be charged with oil and gas similar to the method of charging the unit illustrated in FIGS. 1 to 8.

When the rod 146 is pushed the maximum distance toward the right, the rod end (not shown) meets the plate 157 and then there is a metal-to-metal transmission of forces through the unit.

The following are the approximate dimensions of a hydraulic cushioning unit constructed as illustrated in FIGS. 1 to 8. It should be understood, however, that the dimensions are given as an illustration of a specific embodiment and that the invention is not limited to a unit having these dimensions.

The inner diameter of the high pressure cylinder 71 is 7.5 inches; the maximum stroke of the piston 91 is 20 inches; the diameter of the rod 24 is 4 inches; the piston displaces 251 cubic inches in moving from the neutral to the loaded positions; the unit is charged with 1,328 cubic inches of oil; and the volume remaining for the gas when the piston is in the neutral position is 457 cubic inches, and this volume includes the space in the ears 87. The gas is compressed down to a volume of 206 cubic inches when the piston moves to its fully loaded position. When the piston is in the neutral position the ratio of the oil to the gas is 2.91 to 1, and when the piston is in the fully loaded position this ratio is 6.45 to 1. The compression ratio is 2.22 to 1.

The volume occupied by the oil when the unit is in the neutral position should not be more than approximately 76 percent of the total reservoir volume including the extension. The gas should not be compressed any more than down to approximately 40 percent of its neutral volume. The oil is a standard hydraulic oil commonly used in such units, and the compressed gas is nitrogen.

A unit constructed as described provides numerous advantages. The advantages of a gas return arrangement are attained without an excessive gas pressure. The relatively low gas pressure provides improved cushioning performance because of the increased pressure differential across the holes 81, and it removes the danger that the unit will burst. The relatively large amounts of oil and gas enable the oil to absorb a relatively large amount of the gas, and the amount of the gas dissolved in the oil increases with an increase in the pressure or temperature, thus improving the stability of the unit. The round cross-sectional shapes of the inner and outer cylinders simplifies manufacture of the unit, and the unique filling arrangement ensures that the correct volumes of oil and gas will be charged in the unit.

What is claimed is:

1. A hydraulic cushioning unit for use in a railway car, comprising a high pressure inner member, an outer member encompassing said inner member and mounted concentrically therewith, a piston movable through said inner member, head means at the ends of said members for closing the ends thereof, said head means and said outer member forming a main reservoir, a plurality of holes formed through the wall of said inner member, one only of said head means having a piston rod opening formed therein, a piston rod connected to said piston and extending out of said main reservoir through said opening, at least one reservoir extension means at the upper side of unit, and passage means connecting said extension means and said main reservoir, a hydraulic oil partially filling said main reservoir and said extension means, and an inert gas under pressure filling the remainder of said main reservoir and said extension means, said oil and gas being in contact and intermixing in said main reservoir and said extension means.

2. Apparatus as in claim 1, wherein said reservoir extension means comprises at least one ear member secured to the outer surface of said outer member adjacent the upper side thereof, and said passage means comprises at least one hole formed through the wall of said outer member.

3. Apparatus as in claim 2, wherein said inner and outer members are substantially circular in cross-section, there being one of said head means at each end of said inner and outer members, each of said head means having a generally square configuration, there being two of said ear members, and each of said ear members being secured to the outer surface of said outer member and not extending outside of the outline of said head means.

4. Apparatus as in claim 2, wherein each of said inner and outer members is substantially circular in cross-section, and one of said ear members is secured to said outer member on each side of the vertical center line of said outer member, said ear members further being above the horizontal center line of said outer member, each of said ear members having an angle shaped cross-section and the edges of said ear members being secured to the outer surface of said outer member.

5. Apparatus as in claim 1, and further including charging means in said unit for charging less than approximately 76 percent of the neutral volume of said main reservoir and said extension means with said hydraulic oil and substantially the balance of said volume with said inert gas.

6. Apparatus as in claim 5, wherein said gas is nitrogen.

7. Apparatus as in claim 5, wherein said neutral volume, the displacement of said piston, and said piston rod are sized to compress said gas no more than down to approximately 40 percent of its neutral volume.

8. A hydraulic cushioning unit for use in a railway car, comprising a high pressure inner member, an outer member encompassing said inner member, a piston movable through said inner member, head means at the ends of said members for closing the ends thereof, said head means and said outer member forming a main reservoir, a plurality of holes formed through the wall of said inner member, one only of said head means having a piston rod opening formed therein, a piston rod connected to said piston and extending out of said main reservoir through said opening, at least one reservoir extension means at the upper side of unit, and passage means connecting said extension means and said main reservoir, a hydraulic oil partially filling said main reservoir and said extension means, and an inert gas under pressure filling the remainder of said main reservoir and said extension means, said oil and gas being in contact and intermixing in said main reservoir and said extension means, charging means in said unit for charging less than approximately 76 percent of the neutral volume of said main reservoir and said extension means with said hydraulic oil and substantially the balance of said volume with said inert gas, said neutral volume, the displacement of said piston, and said piston rod being sized to compress said gas no more than down to approximately 40 percent of its neutral volume, the pressure of said gas being approximately 600 psi when said unit is in neutral position and approximately 2000 psi when said unit is in loaded position.

9. A hydraulic cushioning unit for use in a railway car, comprising a high pressure inner member, an outer member encompassing said inner member, a piston movable through said inner member, head means at the ends of said members for closing the ends thereof, said head means and said outer member forming a main reservoir, a plurality of holes formed through the wall of said inner member, one only of said head means having a piston rod opening formed therein, a piston rod connected to said piston and extending out of said main reservoir through said opening, at least one reservoir extension means at the upper side of unit, and passage means connecting said extension means and said main reservoir, a hydraulic oil partially filling said main reservoir and said extension means, and an inert gas under pressure filling the remainder of said main reservoir and said extension means, said oil and gas being in contact and intermixing in said main reservoir and said extension means, said reservoir extension means being fastened to said one of said head members and extending above said piston rod, and said passage means being formed through said one of said head members.

10. A hydraulic cushioning unit for use in a railway car, comprising a high pressure inner member, an outer member encompassing said inner member and mounted concentrically therewith, a piston movable through said inner member, head means at the ends of said members for closing the ends thereof, said head means and said outer member forming a main reservoir, a plurality of holes formed through the wall of said inner member, one only of said head means having a piston rod opening formed therein, a piston rod connected to said piston and extending out of said main reservoir through said opening, at least one reservoir extension means at the upper side of unit, and passage means connecting said extension means and said main reservoir, a hydraulic oil filling approximately 75 percent of the total volume formed by said main reservoir and said reservoir extension means when said piston is in a neutral position, and an inert gas under pressure filling approximately the remainder of said total volume, said oil and said gas being in contact and intermixing in said main reservoir and in said extension means.

11. Apparatus as in claim 10, wherein said total reservoir, the stroke of said piston, and the size of said piston rod result in compression of said gas down to no less than approximately 40 percent of its volume when said piston is in said neutral position.

12. Apparatus as in claim 10, wherein a portion of said gas is absorbed by said oil and said oil and said gas produce foam, the amounts of said absorption and said foaming increasing with an increase in the temperature and the pressure in said unit.

13. Apparatus as in claim 10, wherein the compression ratio of said unit is approximately 2.22 to 1.

14. Apparatus as in claim 10, wherein the pressure of said gas at approximately 70° F and with said piston in said neutral position is approximately 600 psi.

15. A hydraulic cushioning unit for use in a railway car, comprising a high pressure inner member, an outer member encompassing said inner member, a piston movable through said inner member, head means at the ends of said members for closing the ends thereof, said head means and said outer member forming a main reservoir, a plurality of holes formed through the wall of said inner member, a piston rod connected to said piston and extending out of said main reservoir through an opening formed in one of said head means, at least one reservoir extension means at the upper side of the unit, and passage means connecting said extension means and said main reservoir, a hydraulic oil filling approximately 75 percent of the total volume formed by said main reservoir and said reservoir extension means when said piston is in a neutral position, an inert gas filling approximately the remainder of said total volume, said unit having an oil charging passage formed therein and a gas charging passage formed therein, a tube extending from said gas charging passage upwardly to above the level of said piston, said oil filling said total volume up to the level of the upper end of said tube, and said gas filling the portion of said total volume above said tube.

* * * * *